United States Patent
Steenhakkers

(10) Patent No.: US 8,818,340 B2
(45) Date of Patent: Aug. 26, 2014

(54) METHOD FOR COLLECTING DATA OF USERS OF ACTIVE MOBILE TELEPHONES

(75) Inventor: Wim Steenhakkers, Susteren (NL)

(73) Assignee: Mezuro B.V.

( * ) Notice: Subject to any disclaimer, the term of this patent is extended or adjusted under 35 U.S.C. 154(b) by 0 days.

(21) Appl. No.: 13/377,114

(22) PCT Filed: Jun. 10, 2010

(86) PCT No.: PCT/NL2010/050356
§ 371 (c)(1),
(2), (4) Date: Feb. 24, 2012

(87) PCT Pub. No.: WO2010/143955
PCT Pub. Date: Dec. 16, 2010

(65) Prior Publication Data
US 2012/0142321 A1 Jun. 7, 2012

(30) Foreign Application Priority Data
Jun. 10, 2009 (NL) ..................................... 2002997

(51) Int. Cl.
| | |
|---|---|
| *H04M 11/00* | (2006.01) |
| *H04M 11/04* | (2006.01) |
| *H04M 3/42* | (2006.01) |
| *H04M 3/00* | (2006.01) |
| *H04W 24/00* | (2009.01) |
| *H04W 4/00* | (2009.01) |
| *G01C 21/00* | (2006.01) |
| *G08G 1/123* | (2006.01) |
| *G01S 19/00* | (2010.01) |

(52) U.S. Cl.
USPC ..................... 455/414.1; 455/403; 455/404.2; 455/414.2; 455/416; 455/456.5; 455/456.6; 455/457; 455/466; 340/980; 340/990; 340/991; 340/992; 340/994; 342/357.2; 342/450

(58) Field of Classification Search
CPC ......... H04M 1/66; H04W 4/18; H04W 16/14; H04B 7/2628
USPC .......... 455/404.1, 404.2, 404.3, 414.1, 414.2, 455/456.1, 456.2, 456.3, 456.4, 456.5, 455/456.6, 457, 405, 416, 418, 466; 342/357.2, 450; 340/539.2, 989–994, 340/995.2
See application file for complete search history.

(56) References Cited

U.S. PATENT DOCUMENTS 6,138,026 A    10/2000    Irvin
6,847,824 B1 *   1/2005    Contractor ................. 455/456.1
(Continued)

*Primary Examiner* — Inder Mehra
(74) *Attorney, Agent, or Firm* — Eric Karich

(57) ABSTRACT

In a method data are collected about users of mobile telephones which are present within a plurality of defined cells between two specified points in time. For this purpose a list of telephone numbers of mobile telephones is retrieved from a data base, which mobile telephones were located in the defined cells between the two specified points in time. The list of telephone numbers is converted into unique numbers to avoid violation of privacy. Subsequently, the cells are defined in which the housing locations of the users of these mobile telephones are situated. This is effected by sending non-noticeable text messages to mobile telephones on various days at a number of different points in time at which most people are expected to be at home. Based on these text messages the locations of the mobile telephones are established. Furthermore, the postal code areas are determined in which the cells of the housing locations are situated and, subsequently, the statistical data associated with these postal codes are retrieved from a further data base. These statistical data are then coupled to the unique numbers of the mobile telephones that were present in defined cells between the specified points in time.

3 Claims, 1 Drawing Sheet

(56) References Cited

U.S. PATENT DOCUMENTS

| | | | |
|---|---|---|---|
| 2002/0187414 A1* | 12/2002 | Foucher et al. | 430/108.21 |
| 2003/0069683 A1* | 4/2003 | Lapidot et al. | 701/117 |
| 2007/0149186 A1* | 6/2007 | Barbosa da Torre et al. | 455/423 |
| 2010/0227593 A1* | 9/2010 | Myr | 455/414.1 |
| 2013/0138479 A1* | 5/2013 | Mohan et al. | 705/7.33 |

* cited by examiner

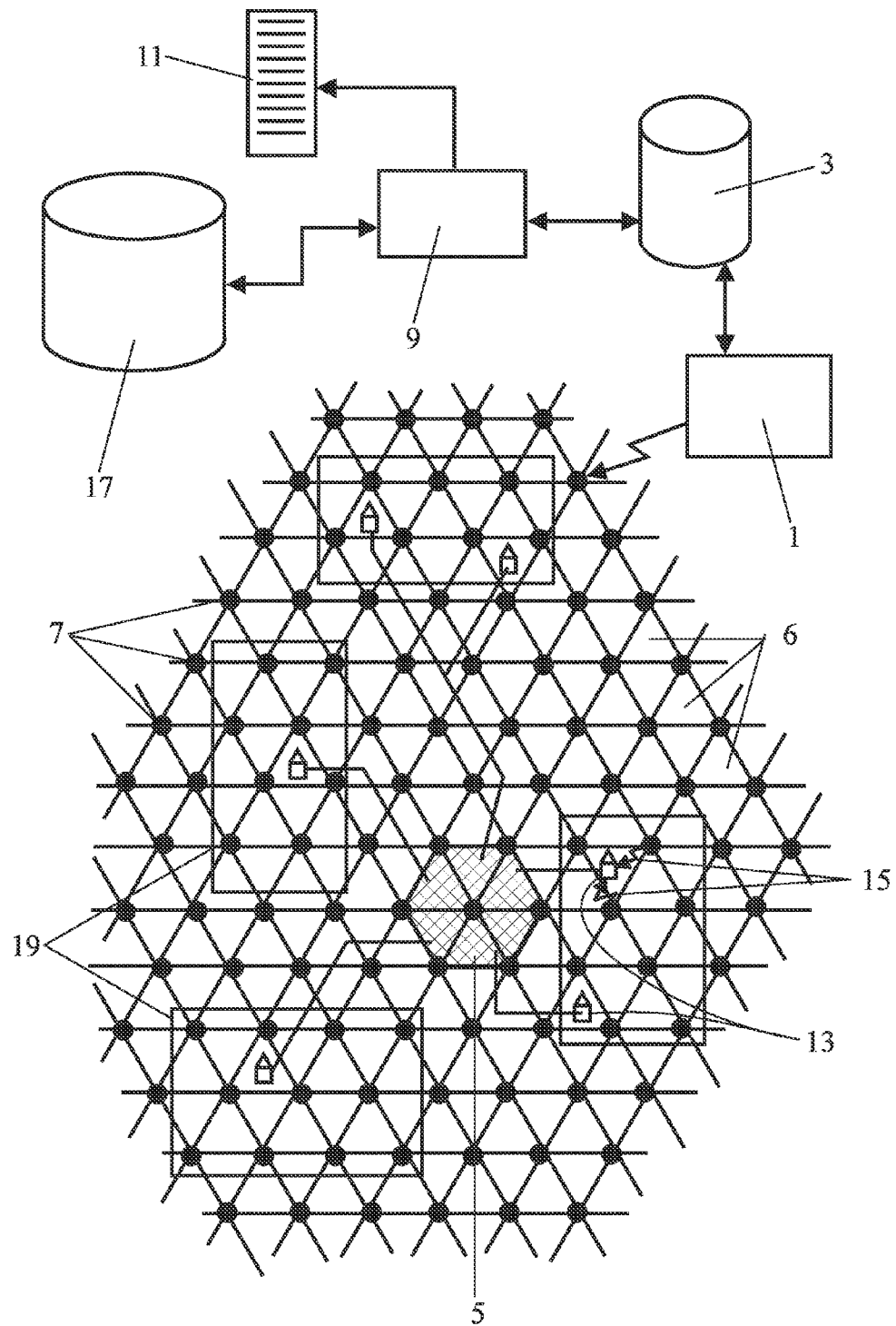

METHOD FOR COLLECTING DATA OF USERS OF ACTIVE MOBILE TELEPHONES

FIELD OF THE INVENTION

The invention relates to a method for collecting data of users of active mobile telephones which are located between two specified points in time within one or more defined cells each defined by at least three adjacent communication masts for mobile communication, while a data base is utilised in which events with active mobile telephones as well as the points in time when and the location where these events take place are stored, where the unique mobile telephone numbers of the mobile telephones are converted into anonymous, unique numbers and the postal code of the owners of the mobile telephones are stored as far as they are known, according to which method data about the active mobile telephones between said points in time in the defined cells are retrieved from this data base. Events are understood to mean for example moves of any active mobile telephones from one cell to an adjacent cell, calling, being called, switching on of a telephone, receiving and sending of text messages. The cells are thus defined by adjacent communication masts forming the corners of a polygon which forms the boundary of the cell. The data base is set up by what is called a Trusted Third Party.

STATE OF THE ART

A method for counting people where active mobile telephones, which are to be understood to mean telephones that are on, are counted, is generally known. There are situations where it is advantageous that one knows where these people come from and what their education and/or income is, without invasion of their privacy. These situations may occur, for example, at free events of which the organisation wishes to have general statistic data about the visitors and what route they have taken to come to the event. Based on the latter data there may then be established whether the visitors have travelled by train or by car.

SUMMARY OF THE INVENTION

It is an object of the invention to provide a method of the type described in the opening paragraph where from the active mobile telephones that were located in defined cells between specified points in time also statistical data of the mobile telephone users are collected without a violation of their privacy. For this purpose, the method according to the invention is characterised in that furthermore statistical data are collected of the users of these retrieved active mobile telephones by retrieving from said data base the postal codes of the addresses of the owners of the mobile telephones and utilising a further data base which contains statistical data about the residents per postal code, while these statistical data are coupled to the associated unique numbers. This makes it possible to gather information about the users of mobile telephones. By utilising a what is called Trusted Third Party for this purpose, which converts the list of telephone numbers into unique numbers, there may be avoided that there is an invasion of privacy of the users of the mobile telephones.

An embodiment of the method according to the invention is characterised in that for those mobile telephones whose postal codes are lacking in the data base or for those mobile telephones that are coupled to a postal code to which more than one predefined number of mobile telephones are coupled in the data base, the cells are defined in which the probable housing locations of the users of the mobile telephones are situated, by imposing events on these mobile telephones at a number of different points in time at which these users are expected to be at home, on the basis of which events the locations of these mobile telephones are established. In this embodiment data are also gathered of active mobile telephones of which the postal codes of the users are not known, for example in the case of prepaid telephones and business telephones where the address stated in the data base is not the address of the user, but the address of the company employing the user.

These imposed events are preferably the sending of non-noticeable text messages. Thus, by sending text messages, which cannot be noticed by the users of the mobile telephones, at points in time when these users are expected to be at home, the area of the postal code where these users live can be defined and based on this the statistical data can be gathered.

A further embodiment of the method according to the invention is characterised in that furthermore the patterns of movement of the active mobile telephones can be retrieved from the data base. For example: from what parts of the country do people come that visited the town centre of Eindhoven on 5 Dec. 2008 between 10.00 and 16.00 hours; what means of transport did they use to come to Eindhoven and how long did they stay there.

BRIEF DESCRIPTION OF THE DRAWING FIGURE

The invention will be further described below in more detail with reference to a diagrammatic representation of an example of embodiment of the method according to the invention given in the drawing FIGURE.

DETAILED DESCRIPTION OF THE DRAWING FIGURE

In an embodiment of the method according to the invention a known system 1 is utilised with which events with active mobile telephones, as well as the points in time when and the location where these events take place, are stored in a data base 3. These events are inter alia movements of any active mobile telephones from one cell to an adjacent cell, calling, being called, switching on a telephone and receiving and sending of text messages. In this data base unique numbers are coupled to these mobile telephones so as not to have an invasion of the users' privacy.

In the method according to the invention there is counted for example how many people are present within a plurality of defined cells 5 between two points in time. Each cell 6 is defined by three adjacent communication masts 7 for mobile communication.

A list of unique numbers that are related to the telephone numbers 11 of mobile telephones that were located in the defined cells 5 between the two specified points in time is retrieved by a Trusted Third Party by means of a computer 9.

Subsequently, the cells 13 are defined in which the housing locations are situated of the owners of the mobile telephones which were situated in the defined cells 5 between the specified points in time. The housing locations of mobile telephone users who have taken out a subscription are known and already incorporated in the data base. The housing locations of users utilising prepaid telephones are not known. For these users the housing locations are determined by sending non-noticeable text messages 15 to all mobile telephones at a plurality of different points in time at which most people are expected to be at home. These text messages are sent by the telecom provider of the mobile telephones. The receiving of these text messages is again an event that is stored in the data base by the known system. The probable housing locations of the users of the mobile telephones can now be retrieved from the data base.

In addition, a further data base 17 in which statistical data about the residents are stored per postal code area is utilised in the method according to the invention. By defining the postal code areas 19 in which the cells of the housing locations of the users are situated and then retrieving the statistical data associated with these postal codes from the further data base 19, it is possible for statistical data of the users of the mobile telephones that were situated in defined cells 5 in a specified period of time, for example, were visiting an event, to be gathered.

Furthermore, from these active mobile telephones the patterns of movement can be gathered if so desired from the data base to obtain information as to how the visitors have travelled to and from the event venue. For example, the following can be retrieved from the data base: from which parts of the country do the people come who visited the centre of Eindhoven on 5 Dec. 2008 between 10.00 and 16.00 hours and via which routes did they come and go? Subsequently, from these patterns of movement can be derived what means of transport they made use of to travel to and from Eindhoven and how long they stayed.

Albeit the invention has been described in the foregoing with reference to the drawing FIGURE, it should be observed that the invention is not by any manner or means restricted to the embodiment shown in the drawing FIGURE. The invention also extends to all embodiments deviating from the embodiment shown in the drawing FIGURE within the spirit and scope defined by the claims.

What is claimed is:

1. A method for collecting demographic information of users of active mobile telephones, each of the active mobile telephones having a unique mobile telephone number, wherein the users have a location within one or more defined cells between two specified points in time, wherein each cell is defined by at least three adjacent communication masts used for mobile communications, the method comprising the steps of:
   receiving data in a database for storing events with the active mobile telephones, wherein the events are calling, sending/receiving a message or data, or the mobile telephones leave the cell, wherein the data comprises the location and the points in time of the events;
   converting the unique mobile telephone numbers of the active mobile telephones into anonymous unique numbers;
   storing postal codes of the addresses of owners of the active mobile telephones;
   retrieving from the database data, including demographic information, about the owners of the active mobile telephones, between said points in time in the defined cells, and the postal codes of the owners of the active mobile telephones;
   associating the anonymous unique numbers to the corresponding statistical data utilizing a further database containing statistical data about the income and educational level of the residents of the postal codes; and
   defining the cells, if the postal codes are not in the database, or if there are more than one active mobile telephones associated with the owners of the active mobile telephones, wherein the cells are defined by retrieving patterns of movement of the active mobile telephones, after the active mobile telephones have left the predetermined cells and occurring outside the two points in time, to generate a probable postal code for the owner.

2. The method of claim 1 wherein, if the postal codes are not in the database, or if there are more than one mobile telephones associated with the owners of the active mobile telephones, the cells are further defined by imposing events on these active mobile telephones at a number of different points in time at which the owners of the active mobile telephones are expected to be at home, establishing a postal code for the owners of the active mobile telephones.

3. The method of claim 2, wherein the imposed events are sending of non-noticeable text messages.

\* \* \* \* \*